United States Patent [19]
Johnson

[11] Patent Number: 5,151,004
[45] Date of Patent: Sep. 29, 1992

[54] VEHICLE FOR MOVING AIRCRAFT
[75] Inventor: Lindley C. Johnson, Argyle, Minn.
[73] Assignee: Johnson Airspray, Inc., Argyle, Minn.
[21] Appl. No.: 680,846
[22] Filed: Apr. 5, 1991
[51] Int. Cl.⁵ .............................................. B65G 67/02
[52] U.S. Cl. ..................... 414/495; 180/209; 180/904; 244/17.17; 244/50; 254/8 R; 280/43.23
[58] Field of Search ......... 414/495; 254/8 R; 244/50, 17.17; 180/904, 200, 202, 209, 160; 280/43.23

[56] References Cited
U.S. PATENT DOCUMENTS

| | | | |
|---|---|---|---|
| 2,235,595 | 3/1941 | Stein | 180/202 |
| 2,362,981 | 11/1944 | Baum | 180/904 X |
| 2,386,516 | 10/1945 | Thompson | 254/8 R X |
| 2,415,056 | 1/1947 | Wheeler | 180/209 |
| 2,638,995 | 5/1953 | Gottlieb | 180/202 |
| 2,700,937 | 2/1955 | Bock | 104/140 |
| 2,729,406 | 1/1956 | Bush | 254/8 R X |
| 2,943,863 | 7/1960 | Corey et al. | 280/79.11 |
| 3,003,571 | 10/1961 | Ash et al. | 180/202 |
| 3,539,065 | 11/1970 | Brownell | 414/495 X |
| 3,544,127 | 12/1970 | Dobson | 280/43.23 X |
| 3,623,562 | 11/1971 | Pitra | 180/200 |
| 3,671,013 | 6/1972 | Everson, Jr. et al. | 254/8 R |
| 3,826,322 | 7/1974 | Williams | 180/202 |
| 3,881,426 | 5/1975 | Long | 105/28 |
| 4,033,422 | 7/1977 | Benning | 414/495 X |
| 4,223,856 | 9/1980 | DiVincenzo | 244/50 |
| 4,324,411 | 4/1982 | MacKenzie | 280/43.23 |
| 4,488,612 | 12/1984 | Patterson | 244/50 X |
| 4,605,086 | 8/1986 | Marom | 180/202 |
| 4,700,798 | 10/1987 | Johansson et al. | 180/209 |
| 4,895,319 | 1/1990 | Bardsen et al. | 244/50 X |

FOREIGN PATENT DOCUMENTS 211399 4/1956 Australia .......................... 414/495

Primary Examiner—David A. Bucci
Attorney, Agent, or Firm—Haugen and Nikolai

[57] ABSTRACT

A vehicle for conveying aircraft is disclosed which includes a carriage system capable of lifting, supporting and conveying an airplane. The system has alternately deployable primary and auxiliary sets of wheels mounted from the carriage chassis. The wheels of the auxiliary set are vertically displaceable relative to the primary set so that the carriage chassis can be alternatively supported by either. A mechanized steering system is provided for the primary set of wheels. A lifting system is provided to lift an airplane of interest between self-supported and carriage-supported dispositions, as required. An engine-driven hydraulic system is provided to operate the vehicle and power the wheel sets, lift mechanism and steering of the primary wheels.

13 Claims, 8 Drawing Sheets

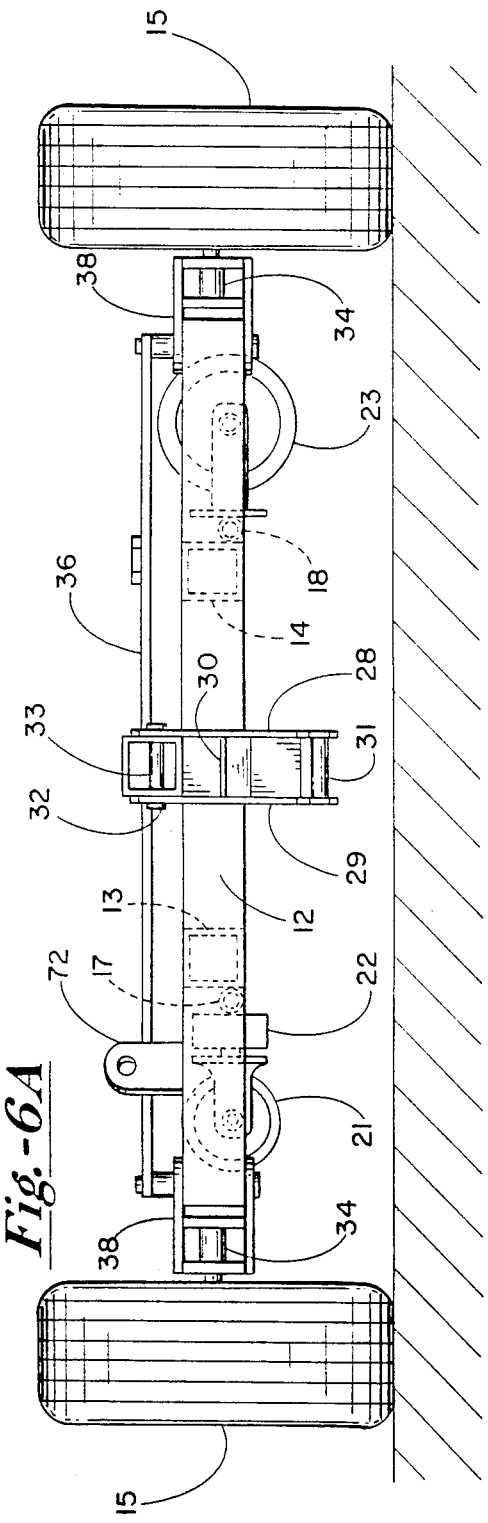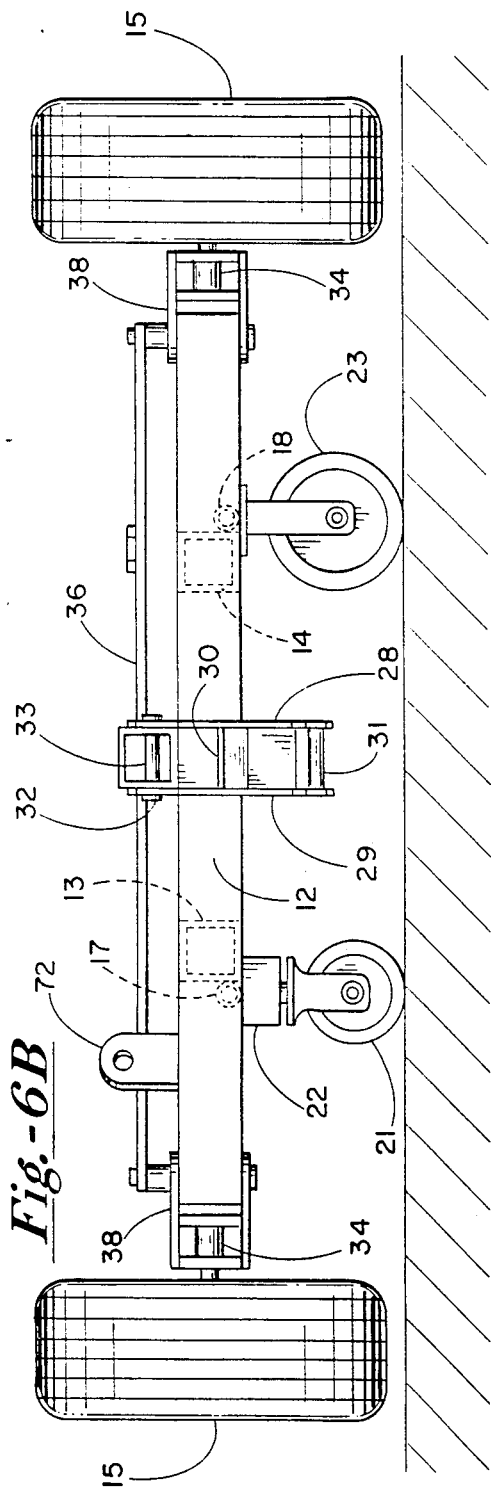

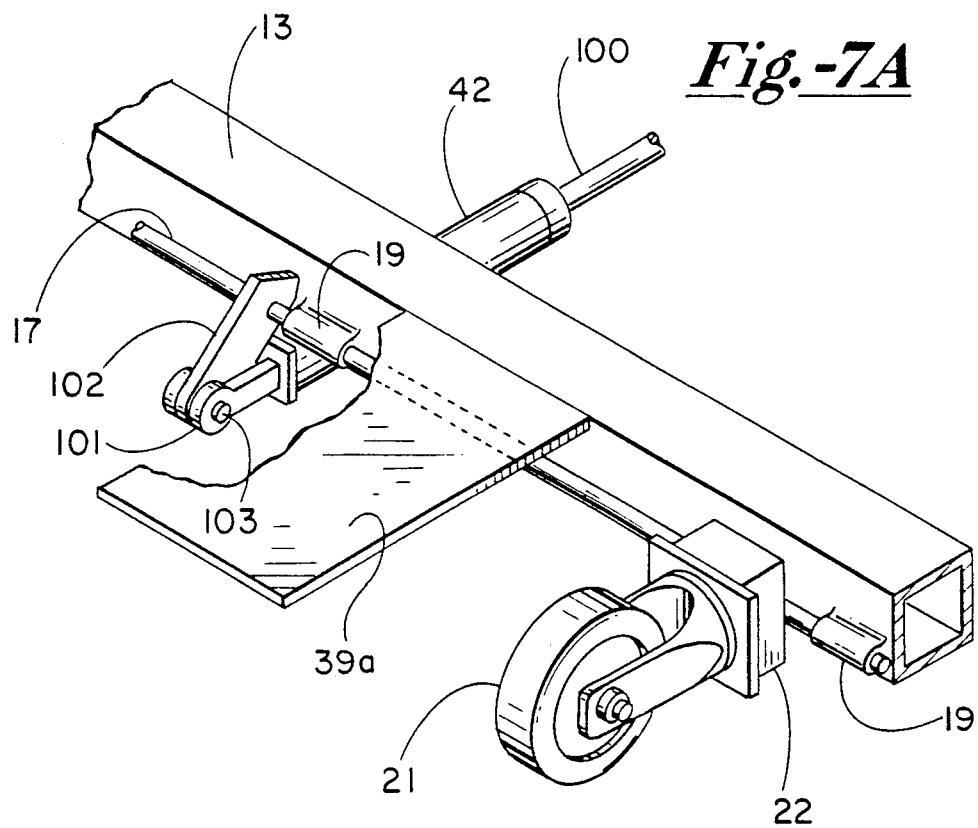
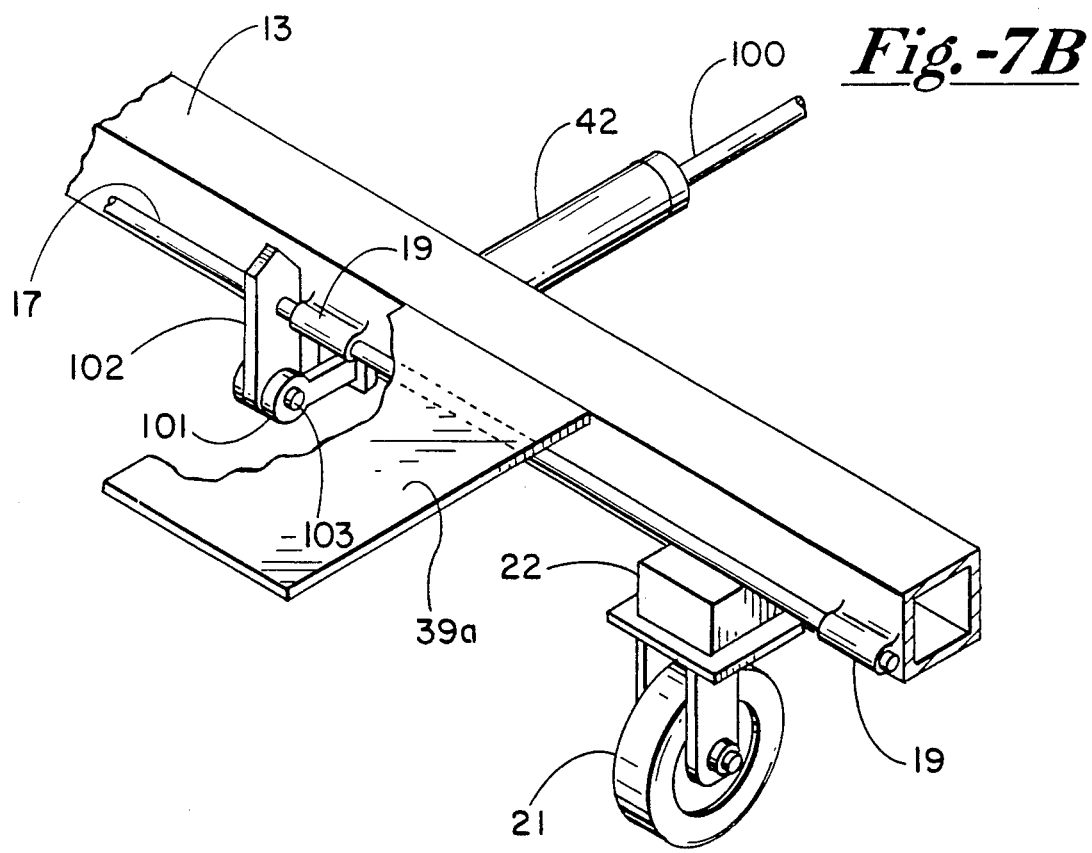

VEHICLE FOR MOVING AIRCRAFT

BACKGROUND OF THE INVENTION

I. Field of the Invention

The present invention is directed generally to a vehicle for moving large self-propelled devices such as airplanes in directions and manners in which they cannot be self-propelled or readily moved by other means. More particularly, the present invention is directed to a specialty carriage vehicle for moving aircraft sideways to access a hangar, or the like.

II. Description of the Related Art

Most aircraft are designed to taxi on triangular landing gear (three-point support) under their own power in a forward or backward direction. Turning is accomplished by steering the nose wheel in types of planes having nose wheels and utilizing swivel-mounted tail wheels for certain other models. Many older types of hangars designed to house such aircraft when not in use are relatively long and narrow and are designed to accommodate a plurality of aircraft disposed one behind another. Certain types of lighter weight aircraft designed for low altitude flying at relatively slow speeds, such as those used in crop dusting or spraying or the like, have a wingspan which greatly exceeds the length of the aircraft and which also exceeds the width of hangar doors or even the hangar building itself in the case of some relatively long and narrow older hangar buildings. In this regard, many of the doors and buildings are of a size which could accommodate such aircraft readily if they were able to maneuver and enter and exit the building doors in a sideways direction rather than addressing them from the front or rear. Accordingly, it would present a great advantage if one were able to move and position aircraft of this class readily in a sideways direction to accommodate ingress and egress from the hangar and also to facilitate parking of the aircraft in the hangar.

The landing gear of planes of this class generally consists of a pair of relatively large symmetrically disposed wheels carried on a pair of strut supported frames, each of which is attached to one side of the fuselage airframe beneath the wings. The third point of support is provided by a rather small pivotally mounted tail wheel.

A moving device would have to be capable of addressing the aircraft head-on in a front-to-back relation between existing landing gear, elevating the plane structure such that it is supported by the carriage system and then moving the carriage system in a direction substantially at right angles to the original direction used in addressing the plane. In order to accomplish this complicated task in a sufficiently simple manner as to be practical, a system would have to be devised, generally, which could alternately be supported in two different modes and moved in two different directions, together with the necessary powered mechanized systems to operate the system as desired Carriage or cart mechanisms have been devised which contemplate more than one set of support wheels which can alternately be used to support and/or convey a load of interest. One such device is illustrated and described in U.S. Pat. No. 3,881,426 to Long, in which a doffing machine for textile spindles is provided with dual sets of wheels in conjunction with an integral jacking and turntable arrangement. The transporting unit normally operates on one parallel rail track using one set of wheels attached to the turntable mechanism; alternatively, as needed, the doffing machine can be lifted or elevated off the rails and supported on the turntable, rotated and lowered onto a different set of rails having an axis which intersects the axis of the first set of rails. Thus, the carriage mechanism can be carried by the turntable wheels or the set of wheels designed to ride the rails alternatively, as desired.

Other devices have been known which can be utilized to move or park heavy objects by moving them in directions abnormal to their conventional, self-propelled directions. These include a car parking mechanism which allows a car to be moved directly sideways on a set of retractable auxiliary wheels as illustrated and described in C. W. Ash, et al. (U.S. Pat. No. 3,003,571). That system is permanently mounted to the chassis of the automobile and does not involve the use of an independent vehicle.

None of the previous devices would be usable to move devices such as airplanes. There remains a definite need for an independent, readily deployable auxiliary carriage vehicle which can be moved beneath the superstructure of an airplane, or the like, readily utilized to lift the plane into position and move the plane in the direction at an angle to that normally described by the landing gear wheels.

SUMMARY OF THE INVENTION

The present invention solves many of the problems associated with prior art devices of the class. The invention involves an independent self-propelled, power-operated carriage conveyance vehicle which includes a carriage chassis alternately supported by primary and auxiliary wheels and lifting capabilities. The vehicle can be readily deployed beneath a structure of interest to be moved, such as an airplane, using auxiliary wheels. Once properly positioned beneath the structure or load to be lifted, a lifting mechanism is deployed to lift the structure of interest such that it is supported by the carriage. Carriage support is shifted to the primary set of wheels to support the carriage loaded with the structure or load of interest. The load can then be moved in any designated direction which may be at an angle, possibly at a right angle, with the direction that the structure of interest might be designed to move on its own wheels. Power-operated mechanized systems are employed to shift the carriage support between the primary and auxiliary sets of wheels and to raise and lower the load or structure of interest to be transported. A steering mechanism is provided with respect to the primary set of wheels to aid in guiding the loaded carriage.

In the preferred embodiment, the operating power is provided by a motor-driven hydraulic pump which operates a plurality of hydraulic cylinders and an hydraulic motor. The hydraulic cylinders, in turn, are mechanically connected to lever devices which are used to deploy or extend and retract the auxiliary set of wheels relative to the primary or main set of wheels, operate the lifting mechanism and modulate the steering of one pair of the primary or main set of wheels. In the preferred embodiment, both sets of wheels contain four wheels disposed in spaced pairs or corresponding to the corners of a rectangle. The auxiliary wheels include a pair of wheels which are swivel mounted in the manner of large casters for ease of positioning of the unloaded carriage mechanism and a pair of fixed wheels. The main wheels are mounted in pairs and fixed in relation to the carriage chassis. One pair of the main wheels is steerable, much in the manner of a typical four-wheel vehicle, and at least one of the other pair is power driven. The hydraulic motor is used to power one of the primary wheels using a chain drive. The entire system is designed to be self-contained and operated by one person with all controls conveniently located together including the motor controls and the hydraulics cylinder operating controls.

BRIEF DESCRIPTION OF THE DRAWINGS

In the drawings, wherein like numerals are utilized to designate like parts throughout the same:

FIGS. 6A and 6B are front elevation views which are partially in phantom and which show additional details of an auxiliary wheel deployment mechanism of the conveyance vehicle of the invention;

FIGS. 7A and 7B are fragmentary perspective views which show additional details of a mechanism for deploying the auxiliary wheels in accordance with the invention.

DETAILED DESCRIPTION

The present invention contemplates a rather compactly built, self-contained vehicle designed to maneuver under a load or address a load normally from a first direction, lift that load and convey it easily in a different direction. This enables rather large cumbersome devices to be lifted and moved in a manner which enables them to be relocated as desired within the confines of rather limited spaces such as in moving airplanes in and out of a rather narrow hangar doors by carrying them in a sideways direction. A detailed embodiment will next be described with reference to certain specific drawing figures.

Figure 1:
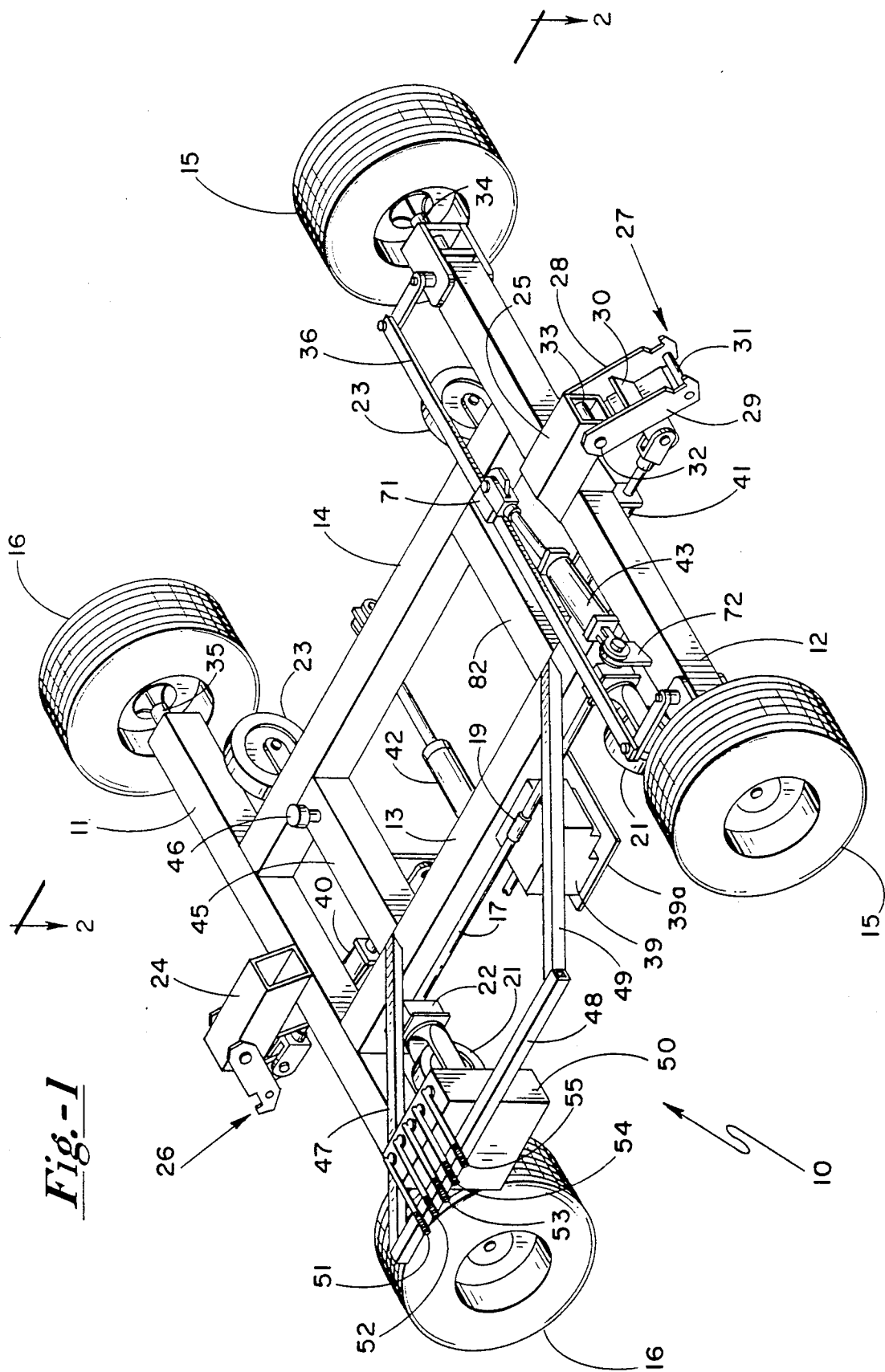
FIG. 1 is a perspective view of a power-operated carriage conveyance vehicle or cart in accordance with the invention.

A perspective view of a carriage vehicle device built in accordance with the invention is depicted generally at 10 in FIG. 1. The vehicle includes a pair of spaced parallel, relatively strong tubular structural members 11 and 12 connected by tubular structural cross-members 13 and 14 which, together, form a rigid main chassis frame. A pair of steerable front wheels 15 mounted from the member 12 and a pair of rear wheels 16 mounted from the member 11 make up the primary or main carriage wheel set. A pair of pipe members 17 and 18 (FIGS. 2 and 7) are journalled in a plurality of sleeve members 19 and 20 which, in turn, are rigidly connected to the members 13 and 14, support the auxiliary wheel set. The auxiliary wheel set includes a pair of swivel-mounted wheels 21, which may resemble conventional caster wheels, and which are connected to the pipe 17 by means of intermediate rectangular tube structural members 22, and a second pair of wheels 23 which are connected to pipe member 18 but do not swivel. These wheels typically are made of rubber, with the wheels of pair 23 typically somewhat larger in diameter than the swivel wheels 21. The spacer members 22 make up the vertical difference so that the vehicle chassis will describe a horizontal plane when all four auxiliary wheels are deployed.

The chassis structure further contains additional oppositely disposed tubular members 24 and 25, respectively, fixed to the structural members 11 and 12. The members 24 and 25 further carry swivel-mounted hook assemblies 26 and 27 (FIG. 3), each of which includes a pair of parallel lift plate members as at 28 and 29 spaced and connected as by a lift brace 30 and a shaft 31. The pivotal joint includes a lift shaft as at 32, and an internal spacer member 33 is also provided. This provides a strong swivelling lifting hook mechanism carried by each of the spaced structural members 11 and 12. While the illustrated pivotal lifting hook mechanisms 26 and 27, as will be seen, are specifically designed to engage and lift one-half of an airplane landing gear, it will be appreciated that one skilled in the art can configure different types of hook arrangements to accommodate other specific loads of interest.

As seen in FIGS. 1, 2, 6A and 6B, the wheels 15 and 16 are carried by suitably journalled stub axle members 34 and 35 which, in turn, are carried by the structural members 12 and 11, respectively. The wheels 15 are provided with a steering mechanism as better seen in FIG. 3 which includes a connecting arm or main tie rod 36 which connects to a pair of steering arms or link members 37 which operate in unison in a well-known manner to pivot wheel carrying structures 38, shown partially in phantom in FIG. 4. A main drive motor 39 is shown mounted on a heavy engine support plate 39a.

Figure 2:
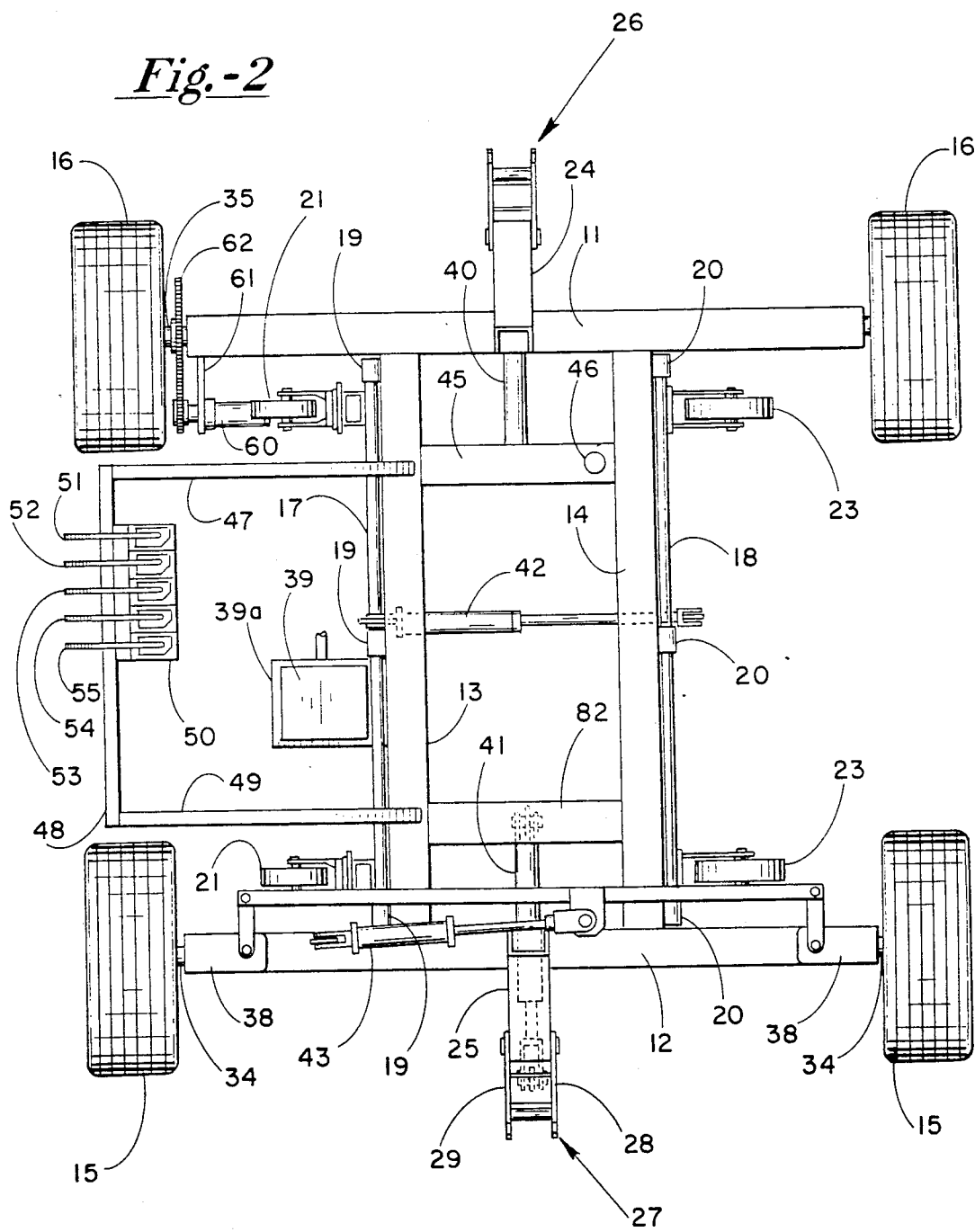
FIG. 2 is a bottom view of the carriage conveyance vehicle of FIG. 1.
Figure 3:
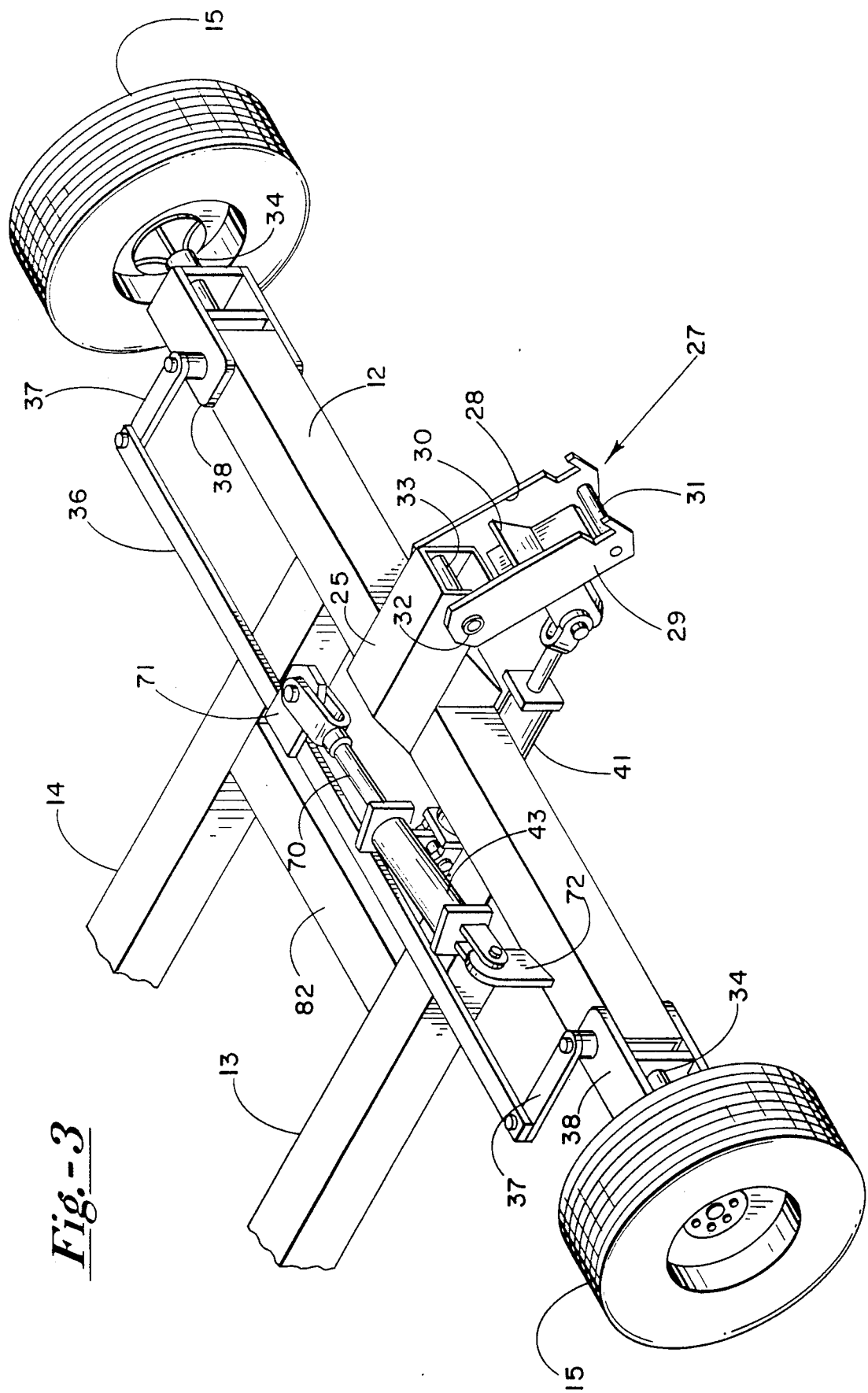
FIG. 3 is an enlarged, fragmentary perspective view showing details of a portion of the carriage of FIG. 1.

The mechanization of the wheel deployment, lifting and steering functions of the carriage vehicle are provided by a plurality of fluid-operated cylinders, as shown in FIGS. 1-3 and better shown in the detailed figures pertaining to specific operated parts. They include a pair of cylinders 40 and 41 utilized to operate the lift mechanisms 26 and 27, respectively. A cylinder 42 is connected to and operates the deployment of the auxiliary wheel system, including pairs of wheels 21 and 23, and a cylinder 43, which is utilized to operate the steering mechanism associated with the wheels 15. An hydraulic or orbit motor 60 is fixed to frame strut member 11 using a strong drive wheel/orbit motor brace member 61 (FIG. 2). The motor 60 drives the adjacent wheel 16 via a pair of sprockets and a chain depicted as drive 62, which is typically a 4:1 speed reduction.

Figure 4:
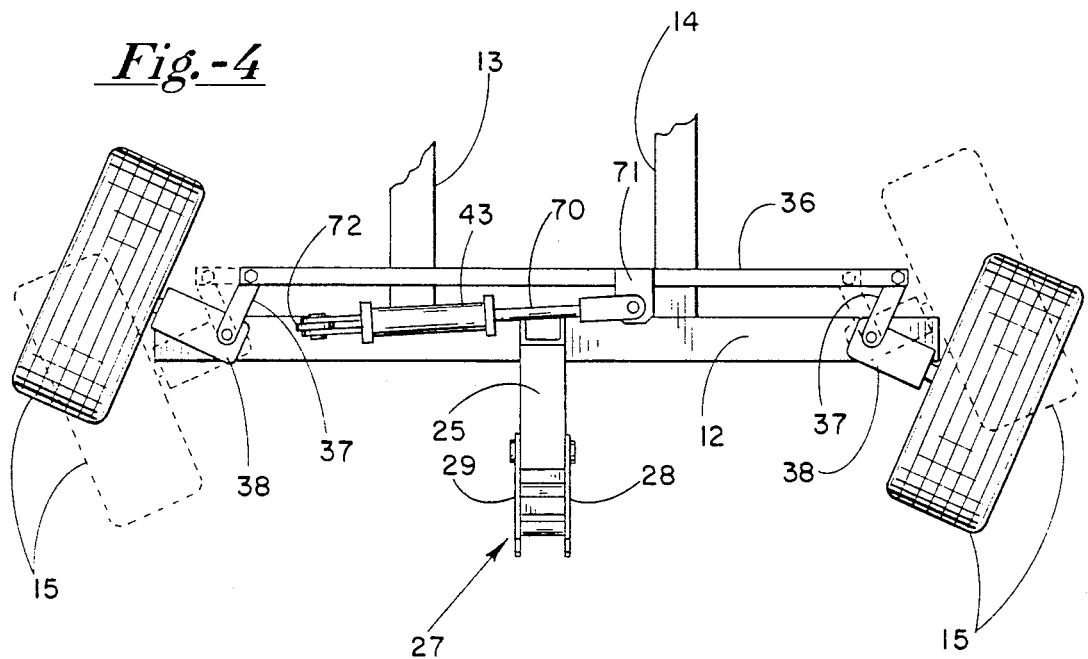
FIG. 4 is a top view of the fragmentary view of FIG. 3 showing an alternate steering position in phantom.

The operation of the steering mechanism associated with the vehicle of the invention is best depicted with respect to FIGS. 3 and 4. The cylinder 43, with piston 70, are pivotally connected between the steering mechanism and the chassis member 12 using cylinder braces 71 and 72. Operation or modulation of the piston rod 70 with respect to the cylinder 43 steers the wheels 15 between the two positions illustrated in FIG. 4 in a well-known manner. The use of the hydraulic cylinder gives the system the added power required to make directional adjustments readily under the stress of a heavy load.

Figure 5A:
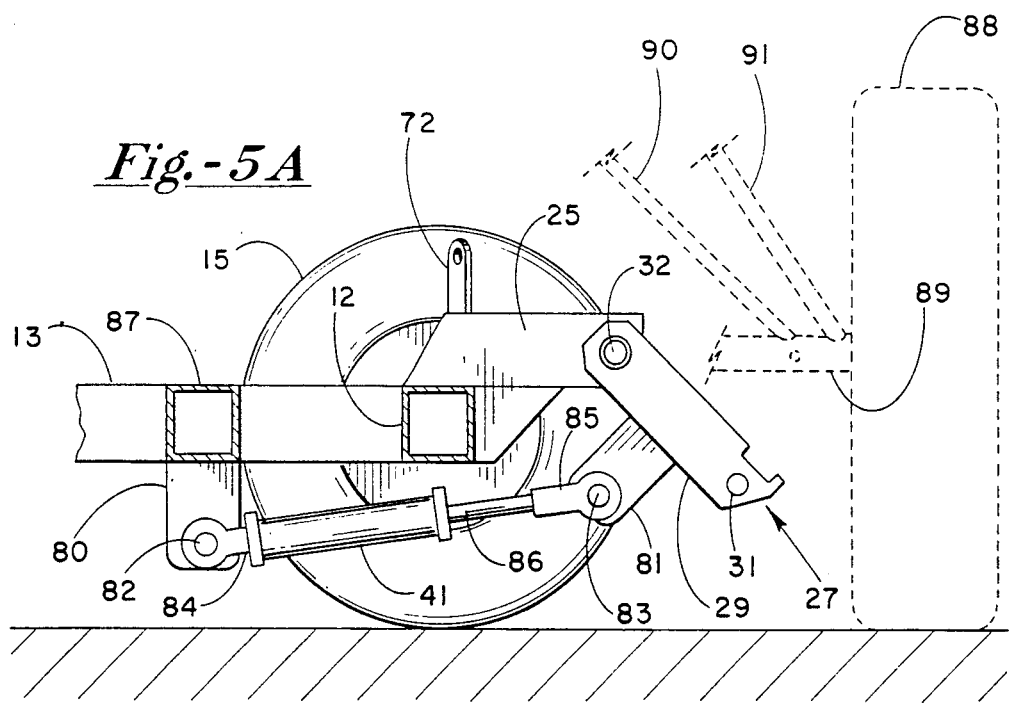
FIGS. 5A-5C are fragmentary side elevational views partially in phantom showing further details of the operation of one lift mechanism of the invention.
Figure 5B:
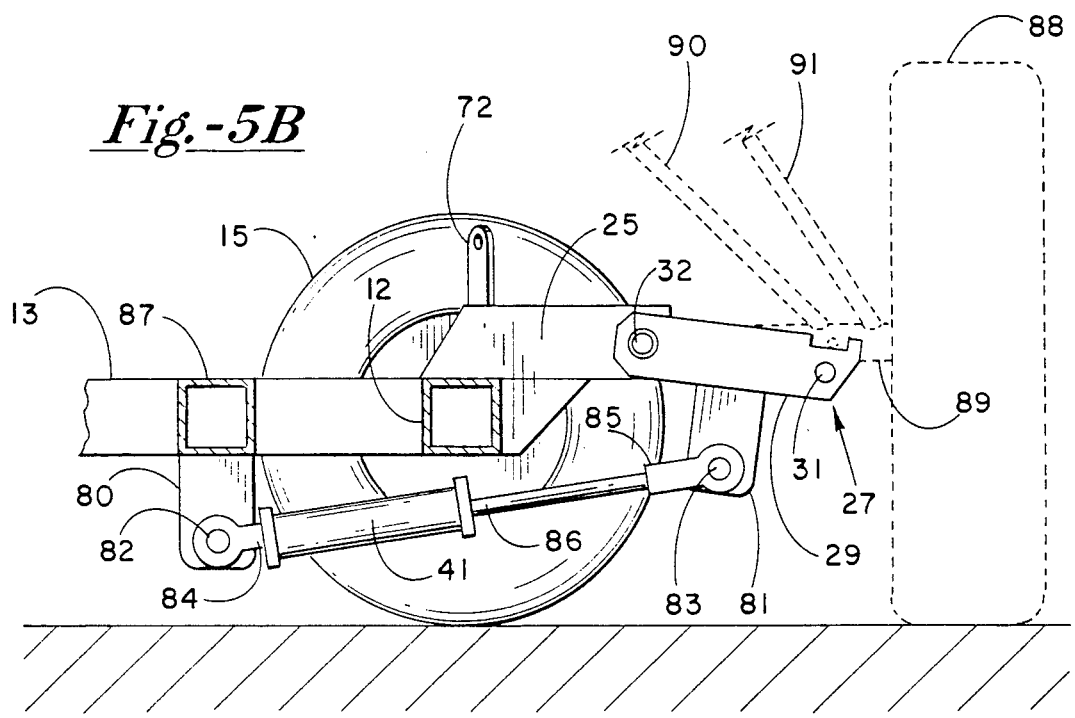
Figure 5C:
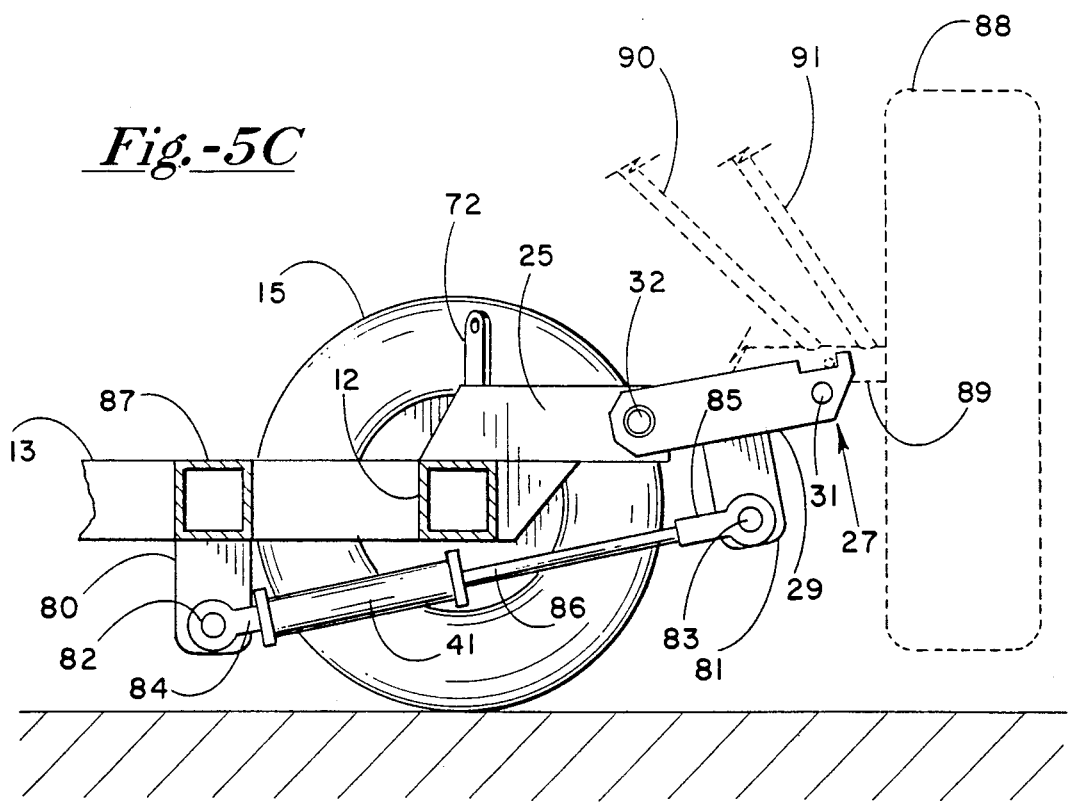

One important aspect of the present invention corresponds to the unique, simplified approach it uses with respect to addressing the load to be conveyed. This is particularly illustrated with reference to FIGS. 5A-5C in the drawings, which depict one of the two hook systems which are deployed in opposed symmetry. As shown in the Figures, the cylinder 41 is swivel-mounted between a pair of cylinder braces 80 and 81, journalled at 82 and 83 via connecting rod members 84 and 85 connected, respectively, to the cylinder 41 and piston 86. The cylinder brace 80 is, in turn, fixed to an additional tubular chassis cross-member 87. As shown in FIG. 5A, when the piston 86 of the cylinder 41 is retracted or withdrawn, the hook mechanism 27 is disposed in a lowered position beneath the aircraft landing gear illustrated in phantom including wheel 88 and strut frame members 89, 90 and 91. These are used to illustrate the relative position of a typical airplane landing gear when addressed by the vehicle of the invention but prior to use of the lifting mechanism. The landing gear axle 89 is addressed by the hook mechanism 27 to lift the landing gear assembly, and with it the airplane of interest, off the support surface, as shown in the drawing FIGS. 5B and 5C. In FIG. 5B, piston 86 is shown partially extended, thereby pivoting the hook assembly 27 to a point where it has engaged the axle 89 of the landing gear of interest. In FIG. 5C, the piston 86 is shown in its fully or nearly fully extended position and the hook assembly 27 has lifted the landing gear of the plane of interest off the ground or floor so that it is then supported by the lifting mechanism of the vehicle of the invention. Of course, the operation of the oppositely disposed hook lifting mechanism 26 is identical and coordinated with the operation of the hook mechanism 27 such that a symmetrical raising or lowering operation is accomplished.

The operation of the mechanized system involving the auxiliary wheels is best illustrated in FIGS. 6A, 6B, 7A and 7B. The details of FIGS. 7A and 7B with respect to the cylinder end of the system are illustrative of an identical system with respect to the rod end, as will be described. The cylinder 42 has an associated piston rod 100. The cylinder 42 is connected via a forked, swivel connecting rod 101 to a cylinder brace member 102 using a hinge pin 103. The cylinder brace member 102 is, in turn, fixed to the plate member 17. In an identical manner, the cylinder piston rod 100 is connected with a cylinder brace (not shown) fixed to the pipe member 18 such that extension and retraction of the piston rod 100 with respect to the cylinder 42 produces rotation of the pipe members 17 and 18, thereby deploying or retracting the pairs of wheels of the auxiliary wheel system, as desired. As shown in the fragmentary view of FIG. 7A, when the cylinder is extended, the pipe 17 is rotated in a clockwise direction and the wheel 21 is pivoted upward to its retracted position. In the fragmentary view of FIG. 7B, the cylinder is shown in a retracted position in which the pipe member 17 is rotated counterclockwise, thereby deploying the wheel 21 in the support position.

As seen in the view of FIGS. 6A and 6B, the deployment of the auxiliary wheel set causes the wheels of the main or primary wheel set to be lifted slightly off of the support surface so that when the auxiliary wheels are deployed, the vehicle rides on the auxiliary wheels. The swivel-mounted wheels 21 are utilized to steer the vehicle when the auxiliary wheels are used, and the system of the preferred embodiment is one in which the auxiliary wheel system is not powered. When the auxiliary system is retracted as shown in FIG. 6A, the chassis of the vehicle is again supported by the primary or main wheel system.

The system is energized by starting the engine 39 which, in turn, through the pump 56 supplies hydraulic power to the entire system. In operation, the vehicle is positioned with respect to a load of interest utilizing the auxiliary set of wheels and, in the case of an airplane, such as a crop spraying airplane, the vehicle is positioned beneath the plane so that each of the hooks 26 and 27 are located directly under the appropriate landing gear axle or strut. The auxiliary wheel system is then retracted and the load is lifted so as to be supported by the transfer vehicle of the invention utilizing the hook systems 26 and 27 as operated by the cylinders 40 and 41. After the load has been successfully raised and is carried by the vehicle of the invention, the primary wheel system, using the steering mechanism including the cylinder 43, can be utilized to move the vehicle as desired to reposition a load. Once the load has been repositioned as desired, hook systems 26 and 27 can, again, be lowered and the vehicle transferred to the auxiliary wheel system for removal for use in transporting another, possibly the same, load to a different location.

While the embodiment, as described, utilizes a control system mounted on one side of the vehicle, it is further contemplated that other types of control mechanisms, possibly remotely located, could just as well be used to control the vehicle. This might include using a wire harness connected to a set of push button controls, or the like, to control certain of the actions of the device so that the operator can move away from the vehicle and get a better overall view of the situation.

Whereas, different types of fluid-operated cylinders, including pneumatic cylinders, can be used, it is preferred that hydraulic operated cylinders be utilized. They are operated using an hydraulic pump which is normally operated by a gasoline driven or other type motor 39 (FIG. 1). An hydraulic fluid reservoir is shown at 45 in FIG. 1, together with an oil spout and cap at 46. A frame, including rectangular tubular structural members 47, 48 and 49, supports an hydraulic control module 50 from the member 13 at a position which can be conveniently addressed by an operator. The control module includes a series of control levers or valve operators 51-55 which are used to control the operation of respective hydraulic cylinders.

Figure 8:
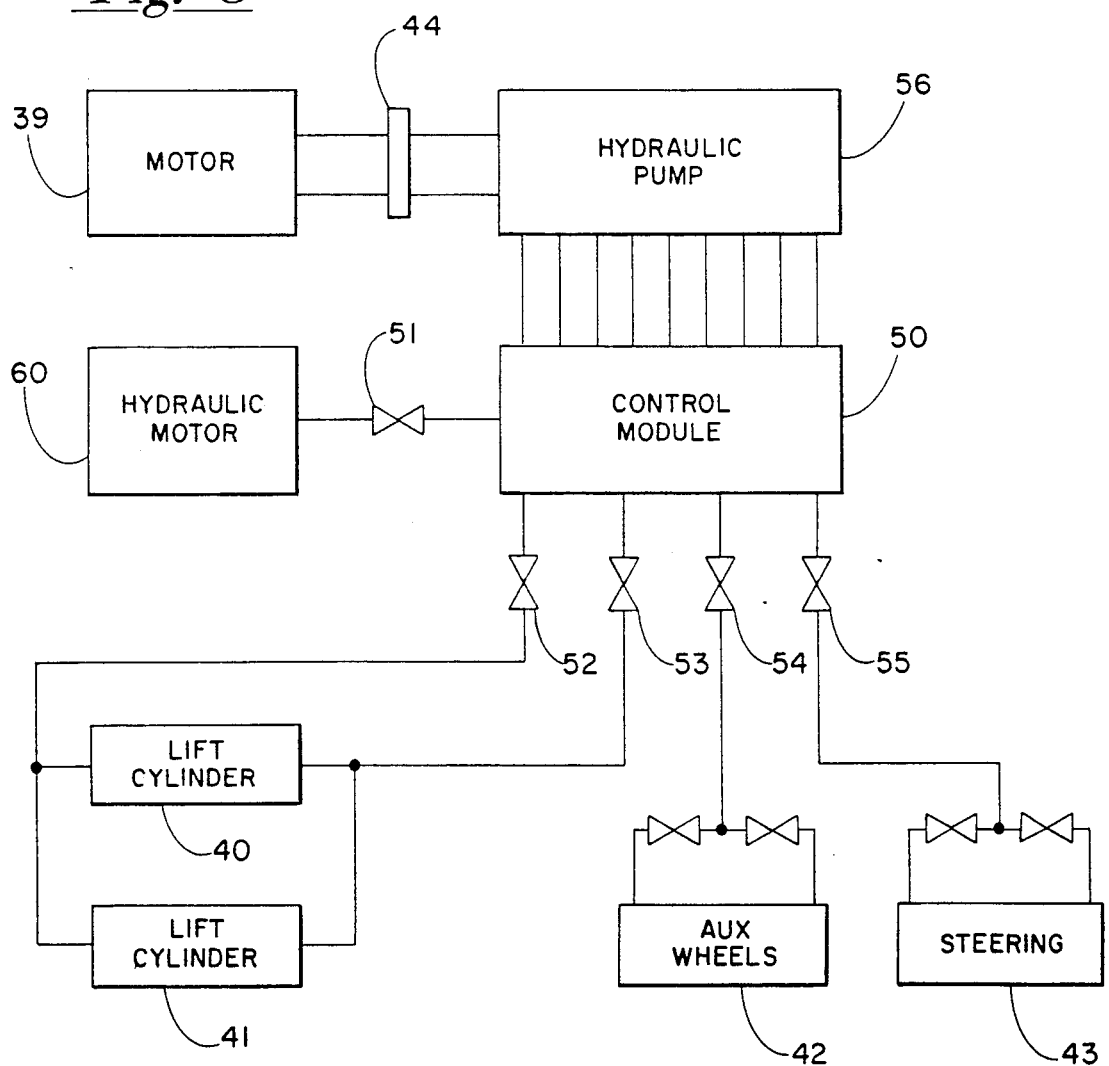
FIG. 8 is a schematic block diagram showing the powered operation of the carriage of the invention.

A schematic diagram of the power-operated mechanization system associated with the vehicle of the invention shown in FIG. 8. That depicts the drive motor 39, which may be a 5 Hp gasoline engine or the like, connected as via a clutch mechanism 44 to the hydraulic pump 56 which, in turn, supplies hydraulic fluid through a control module to operate the cylinders 40 and 41, auxiliary wheel cylinder 42 and the steering mechanism including cylinder 43. The system also operates the hydraulic motor 60 which, in turn, drives a rear wheel of the carriage in accordance with the chain drive system 62 previously described.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A parking carriage for lifting and conveying fixed wing aircraft in a generally lateral direction comprising:
 a carriage chassis including a frame for supporting and conveying an airplane;
 a first set of wheels including a pair of steerable wheels and at least one powered wheel mounted from the carriage chassis frame and deployed to support and convey the carriage chassis relative to a second set of wheels;
 the second set of wheels deployed generally at an angle to the first set of wheels and used to maneuver the carriage chassis to address landing gear of an airplane of interest, the second set of wheels being mounted from the carriage chassis frame and arranged to alternatively support and convey the carriage frame in lieu of the first set of wheels when the second set of wheels is deployed in a supporting position;
 mechanized steering means connected to the pair of steerable wheels for steering the carriage chassis when supported by the first set of wheels;
 mechanized wheel deployed means using a single operating means for modulating the relative vertical position of the first and second sets of wheels to automatically change carriage chassis support between the first and second set of wheels;
 load lifting means comprising a pair of vertically pivoting hook means, one located on either side of and associated with the carriage chassis, the hook means engaging and vertically displacing desired spaced portions of the landing gear of an airplane of interest, the hook means further raising and lowering the airplane of interest thereby shifting support of the airplane of interest between the landing gear and the carriage chassis;
 power-operated mechanical means for operating each of the mechanized; and
 control means for controlling the power operating mechanical means.

2. The parking carriage of claim 1 wherein the power-operated mechanical means comprises a fluid pump and a plurality of fluid cylinders.

3. The parking carriage of claim 2 wherein the power-operated mechanical means comprises an hydraulic pump and a plurality of hydraulic cylinders.

4. The parking carriage of claim 2 wherein wheel deployment and steering are each accomplished using a single fluid cylinder.

5. The parking carriage of claim 3 wherein wheel deployment and steering are each accomplished using a single fluid cylinder.

6. The parking carriage of claim 2 wherein the wheels of the first set of wheels are fixed in spaced relation to the carriage frame and the wheels of the second set of wheels and deployed and retracted relative to the first set of wheels using a single cylinder.

7. The parking carriage of claim 1 wherein the pair of mechanized pivoting hook mechanisms are deployed in opposed symmetry.

8. The parking carriage of claim 5 wherein each of the pair of pivoting hook means is configured to engage a landing gear axle upon being raised.

9. The parking carriage of claim 4 wherein the pair of pivoting hook means are operated by a pair of swivel mounted fluid cylinders.

10. The parking carriage of claim 1 wherein at least one of the wheels of the first set is power driven.

11. The parking carriage of claim 1 wherein the second set of wheels includes a pair of swivel wheels and a pair of fixed position wheels.

12. The parking carriage of claim 6 wherein the second set of wheels includes two pairs of wheels each pair being connected to one of two common rotatable shafts, the two rotatable shafts further being connected to a common fluid operated cylinder which is swivel mounted to levers adapted to rotate the shafts to deploy and retract the second set of wheels in unison.

13. The parking carriage of claim 2 further comprising fixed side offset mounting means for the control means so that an operator avoids interference from the load.

* * * * *

UNITED STATES PATENT AND TRADEMARK OFFICE
CERTIFICATE OF CORRECTION

PATENT NO. : 5,151,004
DATED : September 29, 1992
INVENTOR(S) : Lindley C. Johnson It is certified that error appears in the above-identified patent and that said Letters Patent is hereby corrected as shown below:

Column 7, line 25, delete "deployed" and insert -- deploying -- .

Column 7, line 29, delete "set" and insert -- sets -- .

Column 7, line 41, after "mechanized", insert -- means -- .

Column 8, line 16, delete "and" (first occurrence) and insert --are--.

Signed and Sealed this

Fourteenth Day of September, 1993

Attest:

BRUCE LEHMAN

Attesting Officer  Commissioner of Patents and Trademarks